Feb. 16, 1971  R. K. STRASEL  3,563,012
TRACTOR FOR LAWN MOWERS
Filed Oct. 18, 1968  6 Sheets-Sheet 3
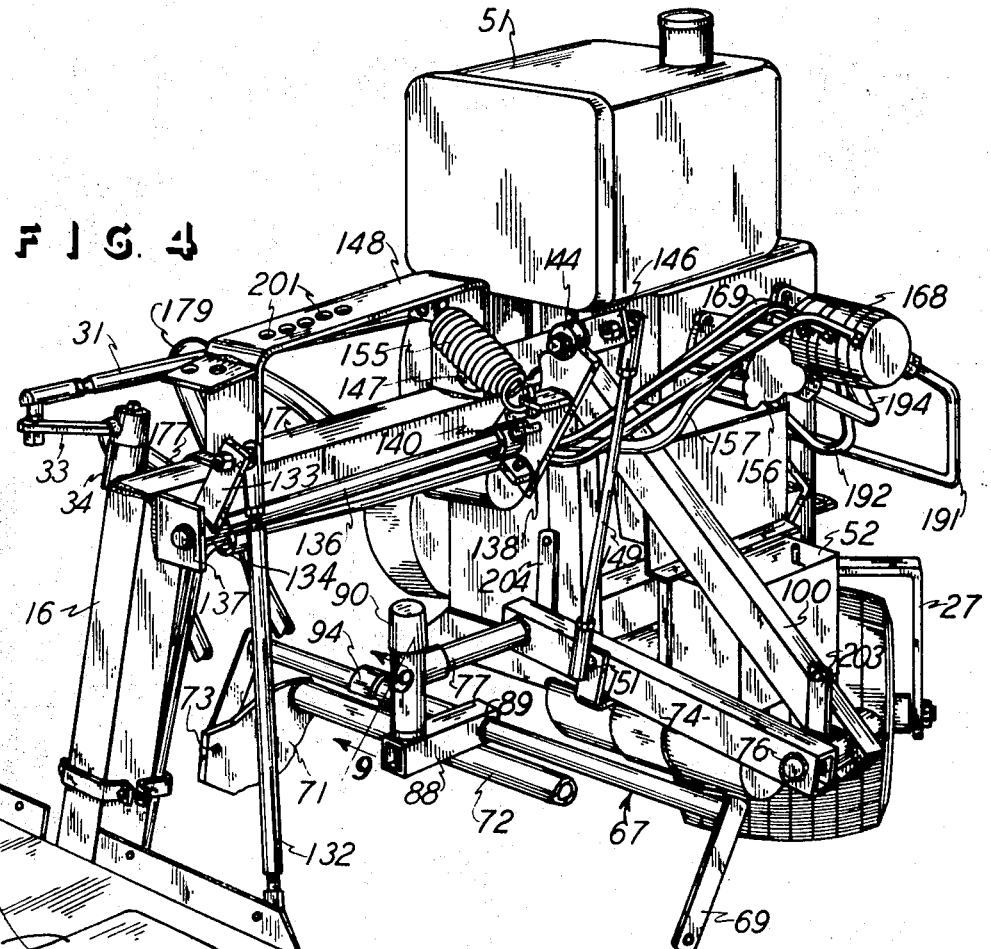
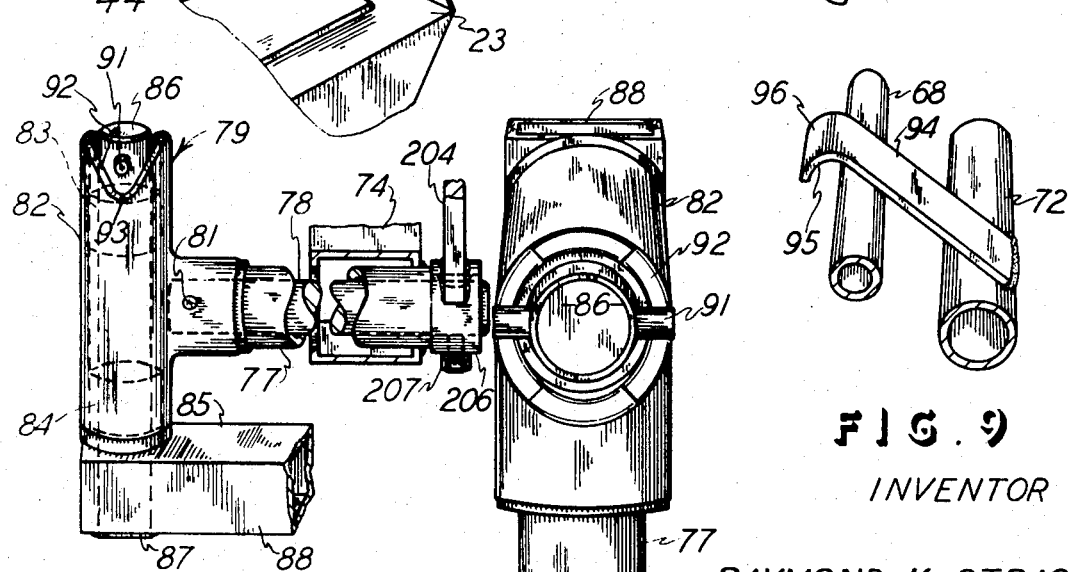
INVENTOR
RAYMOND K. STRASEL
BY: *Arthur J. Hansmann*
ATTORNEY

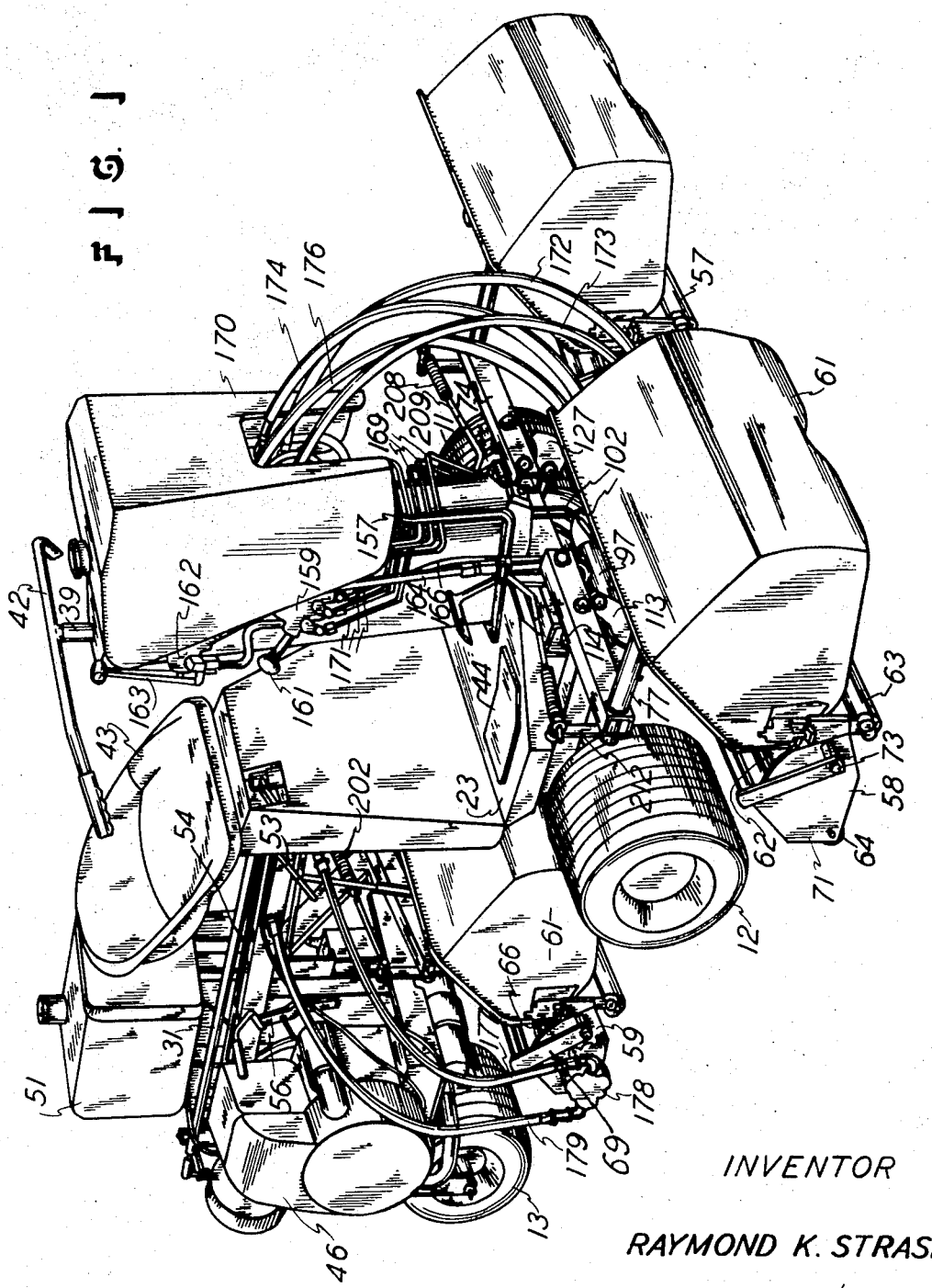

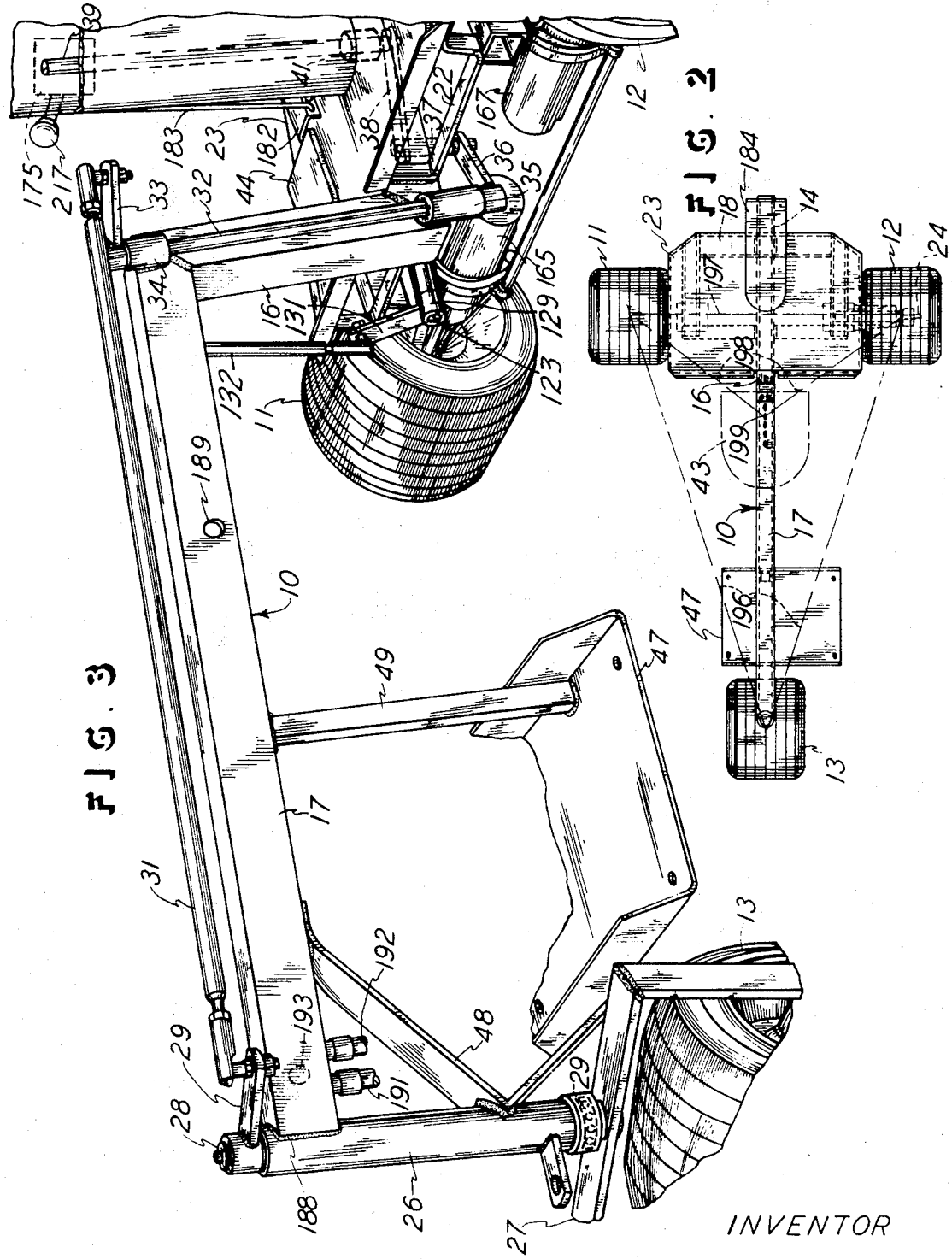

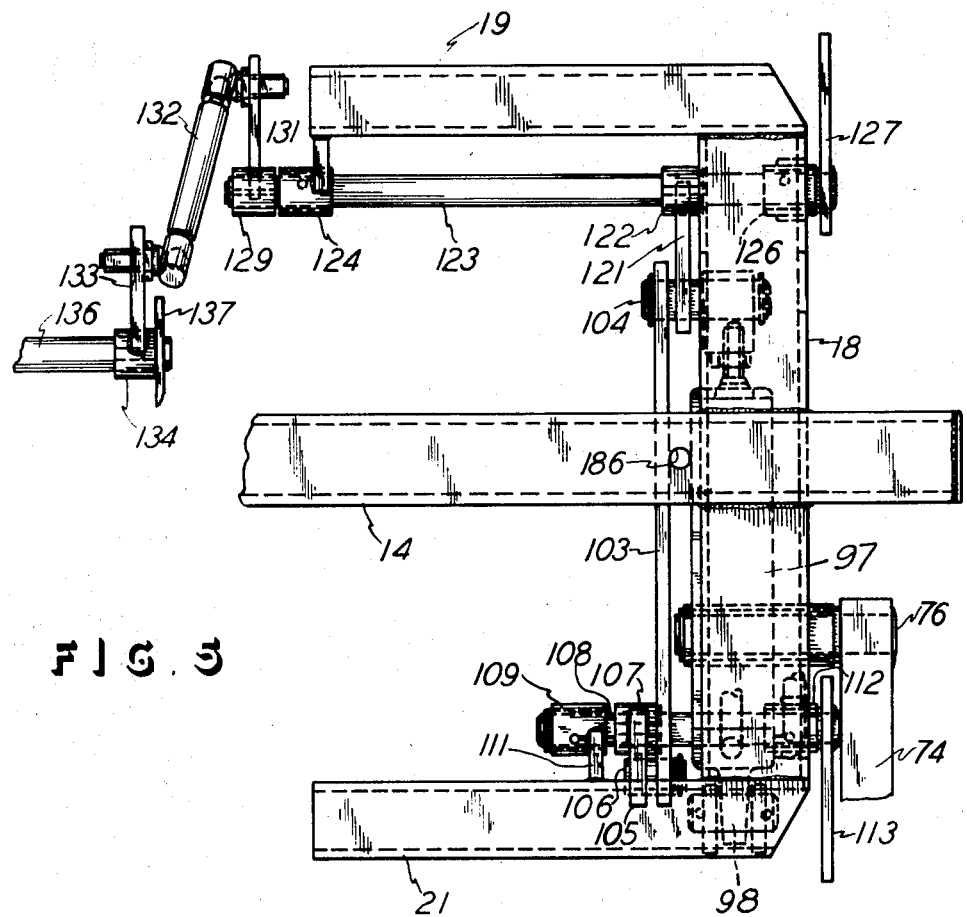

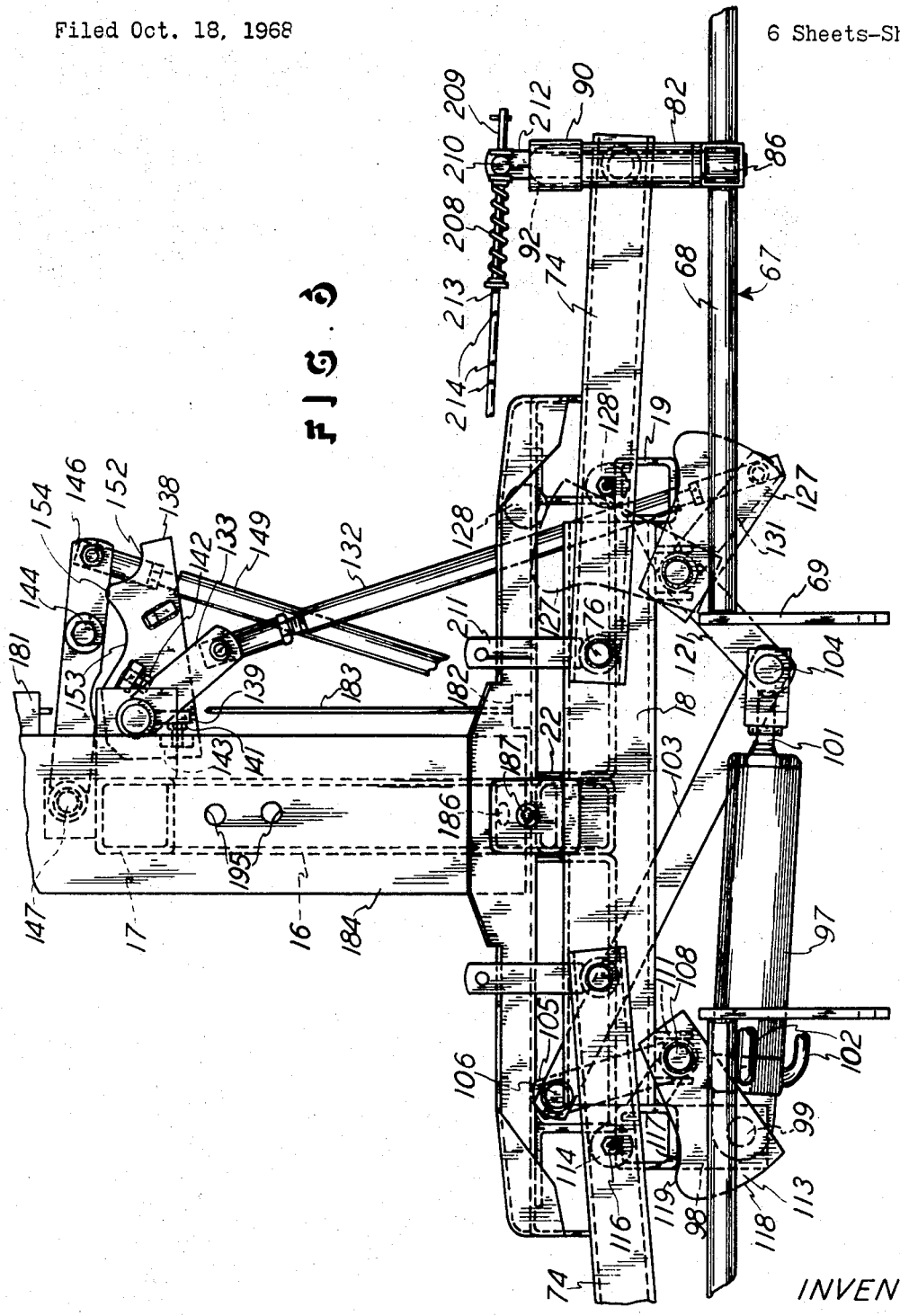

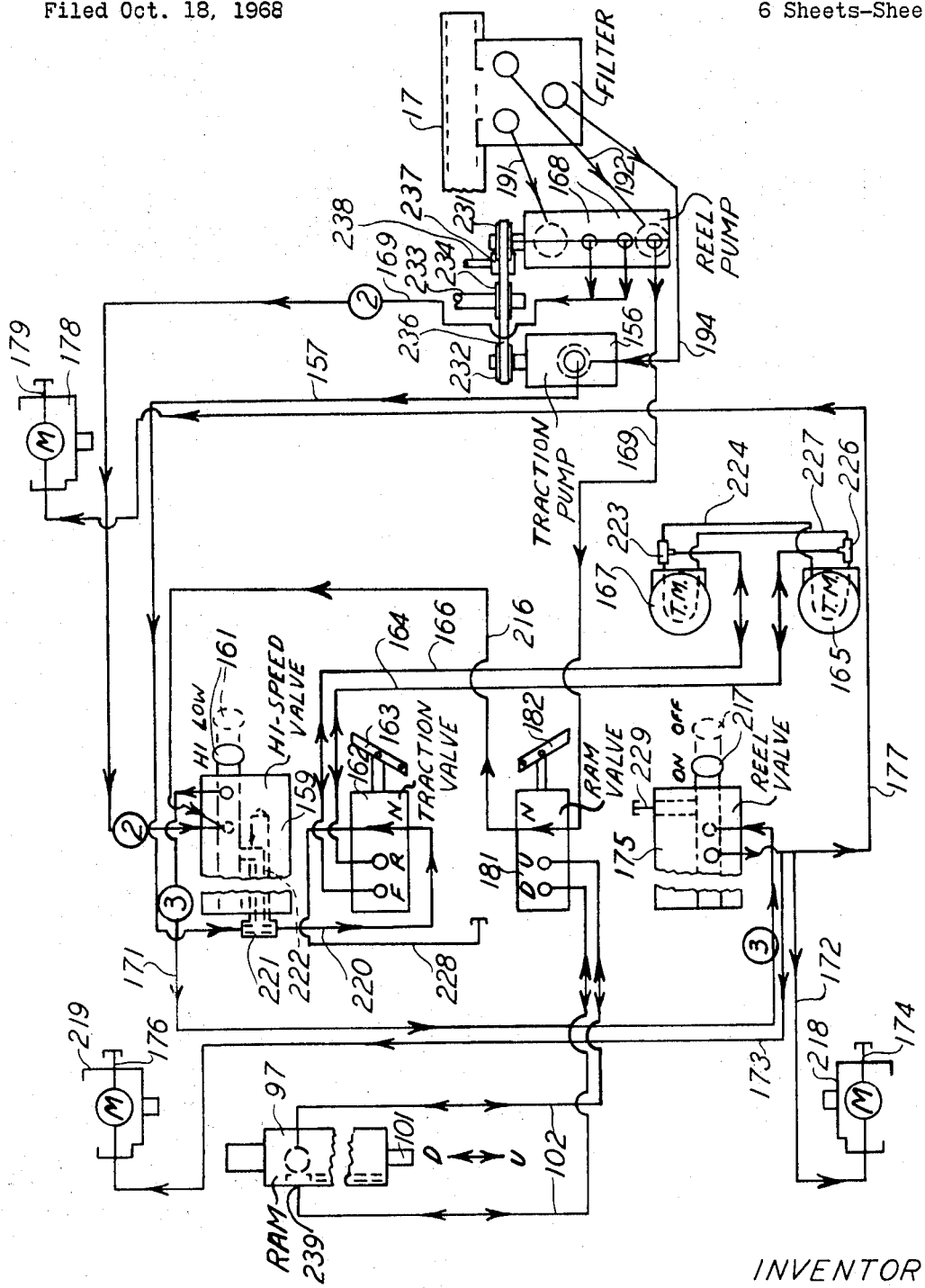

United States Patent Office 3,563,012
Patented Feb. 16, 1971

3,563,012
TRACTOR FOR LAWN MOWERS
Raymond K. Strasel, Winthrop Harbor, Ill., assignor to Jacobsen Manufacturing Company, Racine, Wis., a corporation of Wisconsin
Filed Oct. 18, 1968, Ser. No. 768,647
Int. Cl. A01d *75/30;* B60k *3/00*
U.S. Cl. 56—7                                9 Claims

ABSTRACT OF THE DISCLOSURE

Tractor for lawn mowers of the reel type and pivotally mounted on the tractor. The tractor has three ground wheels, a prime mover, and drive means extending to the wheels and to the lawn mowers. A hydraulic system is shown as the drive means, and the tractor frame provides an operator's seat on the line through the center of gravity of the tractor. The engine is to the rear of the operator's seat, and the tractor frame is hollow for providing the hydraulic capacity and for conducting hydraulic fluid to the desired locations on the tractor.

BACKGROUND OF THE INVENTION

This invention relates to a tractor for lawn mowers. The prior art contains many examples of tractors with a plurality of lawn mowers pivotally mounted on the tractors. Such tractors are commonly of either the walk-behind type or of the riding type. Further, the tractors may be of three wheels or they may be of the four-wheel type. Also, it is common to provide tractors for mounting a plurality of mowers, and having the mowers power-liftable on the tractor and also having the mowers powered for cutting, and such power being supplied by the tractor. Examples of prior art gang-type mowers supported on tractors are shown in U.S. Pats. Nos. 1,330,293 and 2,792,898 and 3,177,638.

The problem with the prior art tractors for gang mowers is that the tractor and the mowers are not a compatible nor integrated unit or machine in the respect that the machine does not provide for optimum visibility of the mowers when the operator is seated on the tractor, it does not provide for a short turning radius of the complete machine, it does not provide for minimum compaction of the turf being mowed, it does not provide for equal distribution of weight on the tractor wheels, there is an excessive compaction by any one wheel, and so that the tractor can be adequately maneuvered without damaging the turf, and the prior art units do not provide a machine which is of a minimum size and weight and parts but with maximum operating features, such as those mentioned, and also with the features of optimum precision in grass mowing.

Therefore, the present invention overcomes the problems heretofore mentioned, and it does so with a tractor specifically provided for supporting mowers capable of precision-cutting of a lawn, particularly with maximum operator safety and comfort, and with a minimum of compaction of the ground due to the weight of the tractor or the mowing units. Specifically, the tractor and machine of this invention is provided for mowing golf course greens, and thus the precise mowing is a feature of the invention and is required in the mowing of the greens.

Still further, the tractor of this invention provides a centrally located operator's seat and platform, with the platform arranged and disposed at the level of the lawn mowers and their attached grass catchers, such that the operator can step easily and directly onto the platform from either side of the tractor. Further, while the operator is occupying the seat on the tractor, he need not straddle or otherwise position himself around parts of the mower, and the operator can simply comfortably sit on the tractor. Thus the tractor has a low center of gravity, it is sturdy in its construction, it is easily maneuvered and can be steered on a small turning radius, and the operator has good control of the mowing units and he can readily see them from his seated position on the tractor. Thus, the operator's platform can be said to be low slung on the tractor, and the mowers are positioned in front of and behind the operator's platform, and all control mechanism extending from front to rear on the tractor extends below the platform so the operator does not have to step over them nor straddle them. The tractor is therefore arranged from front to rear in the sequence of having forwardly mounted mowers, tractor controls including the steering control, the tractor front wheels, the operator's seat, the rear mower, the engine and gas tank, and the rear wheel. All of these elements are in their own vertical planes and do not coincide with each other within one vertical plane, so the advantages mentioned are therefore accomplished with this construction.

BRIEF DESCRIPTION OF THE DRAWING

FIG. 1 is a front perspective view of one embodiment of this invention.

FIG. 2 is a top plan view of certain parts of FIG. 1.

FIG. 3 is a rear perspective view of a fragment of FIG. 1.

FIG. 4 is a front perspective view of the rear fragment of FIG. 1.

FIG. 5 is a top plan view of certain parts of FIG. 1.

FIG. 6 is a front elevational view of certain parts of FIG. 1.

FIG. 7 is a side perspective view of certain parts of FIG. 1.

FIG. 8 is a top perspective view of FIG. 7.

FIG. 9 is a sectional view taken on the line 9—9 of FIG. 4, and showing the parts in a slightly different position.

FIG. 10 is a schematic view of the hydraulic system for the embodiment shown in FIG. 1.

DETAILED DESCRIPTION OF THE PREFERRED EMBODIMENT

The embodiment shown in FIGS. 1–10 generally shows a tractor having a frame generally designated 10 and supported on three pneumatic wheels 11, 12, and 13. Wheels 11 and 12 are forwardly located on the frame 10 and they are traction wheels, and wheel 13 is the rear wheel and it is a steering wheel. The frame 10 includes longitudinally disposed hollow tubular pieces 14, 16, and 17. These three pieces are assembled and welded together as shown, and they extend in the fore-and-aft direction of the tractor and along the central plane thereof. Included as part of the frame is a cross tube 18 which is suitably affixed to the forward end of the tube 14. Side frame tubes 19 and 21 are affixed to the cross tube 18. Also, a brace 22 is seen in FIG. 3 to be connected between the piece 14 and the rear ends of each of the side tubes 19 and 21. The frame pieces described support the platform or operator's station 23 which is suitably affixed to the frame 10 and extends thereover as shown in FIG. 2.

FIG. 2 also shows that the frame 10 supports the front wheel axles 24, for rotatable support of the front wheels 11 and 12. FIG. 3 shows that the frame includes an uprightly disposed sleeve 26 which is affixed to the rear end of the frame piece 17 for supporting the rear wheel 13. Thus the rear wheel 13 has a yoke 27 which serves to suitably rotatably mount the rear wheel 13, and the yoke is affixed to an upstanding post 28 which extends upwardly through the sleeve 26. A ball bearing 29 is disposed between the sleeve 26 and the post 28 to provide adequate rotational and thrust support for the rear end of the tractor with respect to its rear wheel 13.

At this point it will also be noted that the post 28 is rotatable in the sleeve 26 by means of steering linkage which includes an arm 29 affixed to the steering post 28. A link 31 pivotally connects to the arm 29 and extends along the frame piece 17 as shown. Another steering link 32 is pivotally connected to the link 31 by means of an arm 33 being affixed to the link 32 and with the forward end of the link 31 being pivotally connected to the arm 33. Supporting journals 34 and 35 are affixed to the frame for rotatably supporting the link 32 which has an arm 36 affixed and extending therefrom to connect to a link 37 which is connected to a link 38 which is affixed to the steering column 39. The column 39 may be rotatably mounted in a bushing 41 such that rotation of the column 39 about its upright axis will cause pivotal motion of the links 38 and 37, and the arm 36 will then pivot to rotate the link 32 and longitudinally displace the link 31 to steer the rear wheel 13, as desired. FIG. 1 shows that the upper end of the steering column 39 has a steering control or handle bars 42 affixed thereto.

Thus the operator will place his feet on the platform 23 and an operator's seat 43 is suitably mounted on the frame 10 for supporting the operator in a position to control the operation of the tractor. It should be noticed that the platform 23 extends horizontally across the width of the tractor without having any parts project above the platform 23, so the operator can mount the tractor from either side without stepping over or otherwise having to straddle any parts while operating the tractor, if he desires to keep his feet under him while he is in a seated position. In fact, the operator can stand on the platform 23. Therefore, to accomplish the feature of a flat or planar floor board or platform 23, the steering control and linkage described extend below the platform 23, and all other parts also extend below the platform 23 in the area where the operator may place his feet, such as on the foot pads 44.

A prime mover, shown as a gasoline engine 46, is mounted on the rear end of the frame 10. FIGS. 2 and 3 show an engine mounting platform 47 which is supported on the frame 10 by means of braces 48 and 49. In this particular embodiment, the prime mover 46 serves to create the mobilizing or traction power for the tractor, and it also powers the implements mounted on the tractor. It is significant to notice that the prime mover 46 is located rearwardly of the operator's seat 43, and this is for purposes of safety, operator comfort, and particularly for arranging the entire machine for equal distribution of weight on the tractor wheels. Of course it will also be noticed that the tractor wheels are of the wide or terra type, and they therefore exert only a minimum pressure on the ground. It is particularly important when the tractor is on a golf course green that it is desirable that the green remain level and not have the tires make an impression in the turf or green. Further, in the arrangements with the rear wheel 13 being the steering wheel and the tractor being of only three wheels, the entire machine can be steered on a small turning radius without scuffing or otherwise damaging the grass. In fact, with the machine as shown in FIG. 1, there can be a 62-inch mowing swath, but there is only a 36-inch turning radius. Also, with the distribution of components on the machine, and with the tractor wheels arranged and constructed as shown, the entire machine does not create more pressure than a single walking-type powered mower would create. Further, the compaction created by the entire machine is of a pressure less than the heel of a 175 pound golfer stepping on a golf course green. This performance is achieved with the entire machine weighing approximately 1,000 pounds, the engine being approximately 12 horsepower, the tractor having a gas tank 51 which holds sufficient gasoline for four to six hours of mowing time, the mowing speed being over three miles per hour and the transport speed being up to eight miles per hour, and with all the operating components powered, as well as having the machine the riding type. Also, the engine 46 is of the electric starting type, and a battery 52 is suitably supported at the rear of the tractor, and conventional battery connections and relays are provided for controlling the starting of the engine 46, though these connections and parts are not shown.

Also, there is an engine throttle control 53 within easy reach of the operator seated in the seat 43, and the control 53 is connected to the engine through a rod 54. Likewise, there is a clutch lever or control 56 which is operable on the engine drive which will be described later. With this arrangement, from his seated position, the operator can regulate the running of the engine 46, including starting, stopping, and engine speed, which affects the velocity of the tractor relative to the ground as well as affecting the speed of the mowers or implements on the tractor, as will be seen later.

FIG. 1 shows three reel-type mowers 57, 58, and 59 supported on the tractor, and the mowers 57 and 58 are aligned with and directly in front of the front wheels 11 and 12, respectively, and the mower 59 is rearwardly mounted and is aligned with and directly in front of the rear wheel 13. Thus the mowers are arranged and are of a width which will permit them to mow the grass before the wheels reach the portion of the grass which each mower is cutting. Of course it will be understood that the three mowers 57, 58, and 59 are of a uniform or common length, say 22-inch length, and they have sufficient overlap to provide for complete mowing across the width of the tractor even though the mowers are adjusting to the irregularities in the ground and even though they may be turned at steering angles. Nevertheless, the entire mowing swath is 62 inches, as mentioned. Thus the individual mowers are short enough to follow the irregularities in the ground in a manner to produce close cutting of the grass, and the aforementioned features are also accomplished.

Each mower has a grass catcher 61 removably mounted on each mower and being fully supported on the mower. Thus it will be understood that the mowers are all of the forward discharging type so that the grass clippings are thrown forwardly, by means of the commonly provided curved baffles 62 on the mowers, and the clippings are thus deposited in the respective catchers 61. Also, it is significant to notice that the rear mower 59 and its catcher 61 are located in a space adequate for easily accommodating the mower and its catcher so that there is access to the mower 59 and so that the catcher 61 can be readily removed from the mower 59 for emptying the grass and the like. That is, the tractor, particularly the tractor frame 10, is arranged so that there is adequate space for the rear mower and its catcher, as clearly shown in FIGS. 1, 3, and 4. Further, the mowers are all of the type which do not utilize ground wheels, but instead they have forwardly and rearwardly mounted rollers 63 and 64. These reel-type mowers also each have their usual cutting reels 66, one of which is partly shown on the rear mower 59.

FIGS. 1, 4, and 6 show that each of the mowers has a pivotal mounting or support member 67 in the form of a yoke having a cross-tube 68 and affixed end arms 69. A side plate 71 is pivotally mounted on each of the arms 69, and it carries the mower proper by having the mower cross-tube 72 affixed to the plates 71 on each of the mowers. In this manner, the mounting member 67 is a pivotal-type mounting, and the mower is thus capable of pivoting about pins 73 which connect between the arms 69 and the plates 71. Thus the mower is free to pivot about an axis parallel to the longitudinal axis of the mower reel 66, as the rollers 63 and 64 adjust themselves to the irregularities in the ground on which the mower is riding.

Each of the three mowers has a pivot or lift arm connected to it for raising and lowering the mowers between a lowered operating position on the ground and a raised transport position. The three mowers have identical lift arms and attachment means, so only one need be described. Of course the pivot arms for the two front mowers 57 and 58 are simply reversed, as seen in FIG. 1, but they are otherwise the same and like the lift arm and attachment means for the rear mower 59, as shown in FIG. 4. Each mower has a pivot arm 74 which is pivoted on the tractor frame through a pin 76 supported on the frame 10.

The pivot pin 76 for the front mowers 57 and 58 is on the frame cross piece 18 while the pivot pin 76 for the rear mower 59 is on an arm 100 extending downwardly from and affixed to the frame piece 17. FIGS. 5 and 6 show the mechanism for pivoting the lift arms 74 for the front mowers 57 and 58. Thus a hydraulic cylinder 97 is pivotally mounted on ears 98 on the frame 10 to hold a pivot pin 99 for the cylinder 97. A cylinder ram 101 is extendable from the cylinder 97 when hydraulic pressure is controlled with respect to the cylinder and by means of the hydraulic hoses 102 connected to the cylinder 97. A link 103 is pivoted to a pin 104 at the end of the ram 101, and the link pivotally connects to an arm 105 through a pin 106. The arm 105 is affixed to a sleeve 107 which in turn is affixed to a shaft 108. The shaft 108 is rotatably mounted in a journal 109 supported on an arm 111 connected to the frame piece 21 of the tractor. Another journal 112 is affixed to the frame piece 18, and the journal 112 also rotatably supports the shaft 108. A plate 113 is affixed to the forward end of the shaft 108 so that the plate 113 will rotate with the rotation of the shaft 108. Thus, upon projection of the ram 101, the link 103 and the arm 105 are displaced to rotate the plate 113 upwardly, the plate 113 engages a projection or roller 114 mounted on the lift arm 74. Consequently, the arm 74 is caused to pivot upwardly and thereby raise the mower. The roller 114 is shown rotatably mounted on the arm 74 by means of a bolt 116, and the roller 114 is on the rear side of the arm 74 and of course in the path of upright pivotal movement of the plate 113. Also, the plate 113 is cam-shaped in that it has a first surface 117 which engages the roller 114, and it has a second surface 118 which also engages the roller 114 when the lift arm 74 is in its raised or upwardly pivoted position, as shown by the dot-dash lines of the plate and roller on the right in FIG. 6.

The same hydraulic cylinder 97 is also used to raise the rear mower 59. Thus linkage is connected between the cylinder 97 and the rear mower 49 so that only one cylinder 97 is required for raising all three mowers. To accomplish this, FIGS. 3 and 5 show that the rear end of the shaft 123 has a sleeve 129 affixed to the shaft 123 to rotate therewith. FIG. 5 shows the shaft 123 is rotatably supported in frame sleeves 124 and 126, and arm 121 connects between pin 104 and sleeve 122 to rotate sleeve 122 which is keyed to shaft 123. Also, a plate 127 is on shaft 123 to rotate therewith, and plate 127 pivots upwardly to abut roller 128 seen in FIG. 6. An arm 131 rotates with the sleeve 129, and the arm 131 is pivotally connected to a link 132 which also is pivotally connected to an arm 133 affixed to a sleeve 134 on a shaft 136. FIG. 4 shows the shaft 136 is rotatably mounted on a plate 137 on the frame 10, and the shaft 136 extends rearwardly along the frame and is suitably rotatably supported at its rear end on the frame 10, just as with regard to the support plate 137. A cam or pivotal plate 138 is pivotally mounted on the shaft 136 and is immediately in front of the unshown bearing support for the rear end of the shaft 136, and which bearing support is identical to the shown plate 137. The cam plate 138 is free to rotate on the shaft 136, and FIGS. 4 and 6 indicate how it is controlled in its rotation thereon by an arm 139 projecting from a sleeve 140 affixed to the shaft 136 to rotate therewith. Thus the plate 138 has screws 141 and 142 adjustably mounted on the plate by threading into ears 143 affixed to the plate 138. The screws are threadable into and out of the respective ears 143 and are in the arcuate path of movement of the finger or arm 139. Thus, from the shown downward position of the plate 138 as seen in FIG. 6, counterclockwise rotation of the shaft 136 will cause the arm 139 to move into abutting contact with the screw 142. Additional rotational movement of the shaft 136 will pivot the plate 138 upwardly to the position shown in FIG. 4, and tensile spring 155 assists the pivoting in that the spring 155 is connected to piece 148 and to plate 138. In the FIG. 4 position, the plate 138 is shown to be engaged with a roller 144 affixed to a pivot arm 146 mounted on a pin 147 on a tractor frame piece 148. The arm 146 is pivotally connected to a link 149 which is also pivotally connected to a bracket 151 on the mower pivot arm 74. Thus rotation of shaft 136 and plate 138 will cause pivotal movement of the arm 146 to produce raising and lowering of the rear mower through the pivoting of the pivotal arm 74.

The machine is hydraulically powered for both the traction drive and the operation of the three mowers shown. Thus FIG. 4 shows a traction drive pump 156 mounted on the rear of the tractor, and it is driven by the engine 46. A hydraulic pressure line 157 extends from the pump 156 and along the frame pieces 17, 16, and 14. FIG. 1 shows the line 157, and this line connects to a high speed valve 159 suitably mounted on the tractor and having the valve control 161 conveniently located for the operator. As shown in FIG. 10, and more fully described later, the valve 159 is connected with a valve 162 which is also suitably mounted on the tractor and has a control or lever 163 located conveniently for the operator for control of the valve 162 which is the traction valve actually controlling the power to the front traction wheels 11 and 12. Thus, FIG. 1 shows two hydraulic lines 164 and 166, and these lines connect with the traction valve 162 and they connect to hydraulic traction motors 165 and 167 shown in FIG. 3. These two motors are in driving relation to the respective front traction wheels 11 and 12, and thus the tractor is mobilized.

FIG. 1 shows a hood or cover 170 which is suitably mounted on the front end of the tractor to cover the hose connections and portions of the valves described. However, the hydraulic system is fully shown in FIG. 10 and will be described later in connection with FIG. 10.

FIG. 4 also shows three hydraulic pumps 168 having three hydraulic outlet lines 169. These lines also extend along the frame pieces 17, 16, and 14, and they are also shown in FIG. 1, and they connect to the valve 159, as shown in FIG. 10. Three hydraulic lines 171 are connected to the valve 159 and lead therefrom to another valve 175 on the left-hand side of the tractor in a position substantially directly opposite the valve 159, as seen in FIG. 3, for controlling operation of the mower reels 66. From the reel valve 175, two flexible hoses 172 and 173 connect to motors on mowers 57 and 58, respectively, as shown in FIG. 10. Also hoses 174 and 176 connect to the mower motors and form return lines in the hydraulic system, as will be described in connection with FIG. 10. At this point, it should be noticed that the hoses 172, 173, 174, and 176 are flexible so that the mowers can move up and down to adjust to irregularities in the ground and so that they can be raised and lowered, as previously described. FIG. 1 also shows a flexible hose 177 which is connected to the reel valve and extends therefrom and below the operator's platform 23 and to the hydraulic motor 178 connected to the rear mower 59 for driving the reel of the rear mower, as the motors on the front mowers are also connected and arranged for driving their reels. A flexible hose 179 is connected to the motor 178 and serves as a hydraulic return line for the motor 178, as will be described more fully later.

Finally, FIG. 1 also shows the hydraulic cylinder 97 and its two hydraulic lines 102 connected to the cylinder. These lines extend from a valve suitably mounted on the left side of the tractor and immediately above the reel valve mentioned. FIGS. 3 and 6 show the ram valve 181, and they also show a foot pedal control 182 which is suitably movably mounted on the platform 23 for actuation by the left foot of the operator. A connecting rod 183 extends between the valve 181 and the foot pedal 182 so that the operator can control the ram valve 181 by means of his foot, and he need not take his hands off the handle bars or steering control 42 while operating the ram valve 181.

The drawings, including FIG. 2, show a hydraulic reservoir or tank 184 mounted at the front end of the tractor frame and directly over the frame piece 14. The tank is suitably enclosed and it is also in fluid-flow communication with the frame pieces 14, 16, and 17 by having an opening in the frame piece 14, such as the shown opening 186 in FIGS. 5 and 6, in flow communication with an opening in the tank bottom. Further, the frame pieces 14, 16, and 17 are hollow pieces and are welded together to be fluid tight but they permit fluid flow between all of these three pieces. Thus FIGS. 1 and 6 show that the front end of piece 14 has a plate, with a drain plug 187, for fluid tightly closing the front end of piece 14. FIG. 3 shows that the sleeve 26 is fluid-tightly secured with the rear end of frame piece 17 by means of the welding 188, thus the frame itself is used for containing and conducting the hydraulic fluid. FIG. 1 further shows that the return line 179 for motor 178 is connected to the frame piece 17 at an opening 189 shown in FIG. 3. FIG. 3 also shows two fluid lines 191 and 192 and a hole 193, all in the rear end of frame piece 17, and these lines and the hole are related to the pumps 156 and 168. Thus the lines 191 and 192 serve to supply fluid to the reel pumps 168, as also shown in FIG. 10, and the hole 193 provides a passageway for connecting to a line 194 supplying the traction pump 156. Additionally, FIG. 6 shows holes 195 in tank 184 to provide connection points for the return lines 174 and 176 for the hydraulic motors on the front mowers.

It will therefore be understood that the tractor is arranged so that the engine 46 is located rearwardly of the operator's seat, and the tank or reservoir 184 is forwardly of the seat, along with the operating valves and connections for the hydraulic system, so that the tractor is arranged with the weight of the components uniformly acting on the three wheels of the machine. The components, and the entire machine, are arranged so that the center of gravity of the machine is on the vertical or plumb line extending through the operator's seat 43. Therefore, regardless of the weight of the operator, there will be equal weight on the three wheels. FIG. 2 shows a triangle in dot-dash lines 196 and 197 which intersect at the centers of the three wheels. Lines 198 are shown to bisect the triangle lines at the tractor front wheels. Then the intersection at point 199 of the two lines 198, is on the plumb line extending through the center of gravity of the machine, and such plumb line intersects the seat 43. In fact, FIGS. 2 and 4 show that the seat 43 is supported on frame piece 148 which has five holes 201 extending therealong. These holes provide for adjustably positioning the seat 43 along the support piece 148, and the intersecting point 199 is at the second one from the front. Also, the platform 23 is low slung on the tractor and is actually level with the mowers and their catchers 61. So the tractor has a low center of gravity, and is safe on a hillside.

FIG. 10 shows the hydraulic system, and here it will be seen that the traction pump 156 and the reel pumps 168 are connected to the reservoir or hydraulic supply through the line 194 and the lines 191 and 192. The two lines 169 extend from the outlet of the reel pump and directly to the high speed valve 159. The third line 169 extends from the reel pump to the ram valve 181. The drawing schematically shows the ram valve foot control 182, and when the control is in a position shown, namely the "N" or neutral position, then the ram valve simply passes the fluid through an outlet line 216 and into the inlet of the high-speed valve 159. In that way, only one line from the reel pump is diverted for operating the hydraulic cylinder or ram 97, but all three lines from all three reel pumps 168 are directed into the high-speed valve 159. At this time it will then also be noted that the ram valve has a "D" or down and a "U" or up position which refers to the down and up positions of the mowers. Of course the cylinder 97 is a two-way or double-acting type cylinder so that there is positive control in the cylinder for both the raising and the lowering actions.

FIG. 10 further shows the high-speed valve 159 has a "HI" and a "LOW" position, set by the valve control 161, and when the valve is in the low position, then the fluid entering the high-speed valve 159 is directed therefrom in the three lines 171 and into the reel valve 175. Valve 175 has "ON" and "OFF" positions, set by the valve control 217, and the hydraulic hoses, 172, 173 and 177 are shown to extend from the valve 175 and into the respective mower motors. That is, the front mowers 57 and 58 have motors 218 and 219 respectively, and the rear motor 178 is also seen in FIG. 10.

The traction pump 156 has its outlet line 157 extending to a connection 221 on the high-speed valve 159. This connection has a passageway 222 extending into the valve 159 for communication with the reel pump lines leading into the valve 159, and this is when the high-speed valve 159 is in the "HI" position and it is not desired to drive the mower reels. This then permits the outlet from all the pumps 156 and 168 to flow into the traction valve 162 through the line 220. This valve has an "F" or forward position, and it has an "R" or a rearward position, as well as an "N" or neutral position, all set by the control 163. Thus the output of the pumps can be directed to any one of the three positions of the valve 162 and this can cause the hydraulic pressure to be directed to the traction motors 165 and 167 through the hydraulic lines 164 and 166. FIG. 10 further shows that the motors 165 and 167 are connected in a parallel relation so that differential drive action is achieved by the arrangement. That is, where the valve 162 is in the forward drive position, then hydraulic pressure is created in the line 166 and this pressure is exerted on the motor 167 through the T-connection 223. Also, the pressure is exerted on the motor 165 through a line 224 connecting between the T 223 and the motor 165, and both motors are of course driven in the same direction for forward drive of the tractor. Further, the motors exhaust through the line 164 which now acts as a return line having a T-connector 226 at the motor 165 and a cross-over line 227 connected between the T 226 and the motor 167 to take the return flow from the motor 167 and direct it into the return line 164. Of course if the tractor were being driven in reverse, then the lines and connections described would also be acting in a reverse manner so again the differential type drive desired for the front traction wheels 11 and 12 would be achieved.

FIG. 10 also shows that the traction valve 162 and the reel valve 175 have connections 228 and 229, respectively, which lead to the reservoir 184, as previously mentioned. Also, motor return lines 174, 176, and 179 are shown in FIG. 10.

Relative to the synchronous drive of the traction wheels and the mower reels, FIG. 10 shows a pulley 231 drivingly related to the reel pumps 168, and a pulley 232 is shown drivingly related to the traction pump 156. Also, engine 46 has a drive shaft or power take-off shaft 233 which carries a pulley 234 drivingly connected to the pulleys 231 and 232 by means of a belt 236. A clutch roller 237 is engageable with the belt 236 for conventional tightening of the belt so that there can be a drive from the pulley 234 and to the pulleys 231 and 232, in a conventional manner. The roller 237 is supported on a shaft 238 which is controlled by the clutch lever 56 which is within the reach of the operator in the seated position on the seat 43. Thus the pumps are directly driven from the engine 46, and they are therefore driven in unison or in proportion so that any increase in the speed of either of the pulleys will be equally increased in the other pulleys. In this manner, the mobilizing speed of the entire machine, that is the traction speed, and the speed of rotation of the mowers on their cutting reels 66 are synchronized so that the mowers will properly cut in accordance with the forward advance of the entire machine. No gears or additional motors, or other weighty and complicated mechanical parts, are required for the desired synchronization mentioned. Thus if the reel motor speed is 1500 r.p.m., and if the traction motor speed is 110 r.p.m., there is an approximate ratio of 14 to 1. This ratio is retained throughout any and all speeds of the engine 46, and consequently throughout any and all forward speeds of the entire machine. Thus if the mower cutting frequency is such that for each one-quarter inch advance of the machine a cutting blade is effective on the grass, this cutting frequency will be retained throughout all forward speeds of the machine.

When the valve 159 is in the "HIGH" position, the machine is in the transport position in that all of the output of the reel pumps 168 is diverted to the traction valve 162, so valve 159 is like a switch. Where the valve 159 is in the "LOW" position, then the output of the reel pumps 168 is directed to the reel valve 175. This arrangement of having the reel pumps 168 effective for the traction speed of the machine in the transport position permits optimum and maximum speeds with the equipment described. Thus the three reel pumps could each be pumping four gallons per minute, of hydraulic fluid, and the traction pump could be pumping nine and one-half gallons per minute. Then the total of twenty-one and one-half gallons per minute can be directed through the traction valve for driving the machine in the transport position when the high-speed valve 159 is in the "HIGH" position.

Also, whenever the reel pumps 168 are operating, the ram valve 181 will be operative and therefore the hydraulic cylinder 97 can operate to raise and lower the mowers. Further, it will then be understood that the traction wheels are driven with the full power of the tractor, that is with the output of all pumps 156 and 168, but there is no requirement for a switch between parallel and series hydraulic circuits to achieve this. Instead, the high-speed valve 159 and the connections thereto accomplish the desired purpose.

Another fixed proportional drive relation exists between the drive to the traction motors and the powering of the hydraulic cylinder. Thus, whatever the tractor mobilizing speed is, the raising and lowering of the mowers is in accordance with that speed since the cylinder will be receiving hydraulic fluid in a fixed proportion to the pumping of fluid to the traction motors.

This description is of the mowing machine which is shown in U.S. patent application Ser. No. 768,648 filed Oct, 18, 1968, and now U.S. Pat. 3,511,033.

What is claimed is:

1. A riding powered tractor for supporting and mobilizing lawn mowers, comprising a frame, three ground wheels mounted on said frame for supporting the latter and being spaced to form a triangular pattern of two axially aligned front ground wheels and one rear ground wheel, an operator's seat centrally located on said frame, an operator's platform disposed in front of said seat for providing a foot rest for the operator, a steering control connected to said rear ground wheel for steering said tractor and including a hand-rotatable portion disposed forwardly of said seat for actuating said steering control, a prime mover, drive means operatively connected between said prime mover and said two front ground wheels, mower mounting means supporting on said frame for mounting said mowers in front of each of said three wheels in alignment with said three wheels, the arrangement of all the aforesaid components being such that some of the aforesaid components are disposed forwardly of said seat and some of the aforesaid components are disposed rearwardly of said seat, and all said components are disposed relative to each other to have the center of gravity of said tractor located along a vertical line extending through said operator's seat when said ground wheels are on a horizontal plane, and said three wheels being horizontally spaced from said vertical line to have said vertical line intersect the point of intersection of three lines bi-secting the three angles of said triangular pattern for the equal weight of said tractor on each of said three wheels.

2. The subject matter of claim 1, wherein said steering control includes steering linkage extending from said hand-rotatable portion and below said platform and to said rear ground wheel.

3. The subject matter of claim 2, wherein said platform extends across said tractor and has a horizontal upper surface extending thereacross and is free of any tractor parts being mounted on and extending directly over said upper surface, so said platform is clear for mounting by the operator from either side of said tractor.

4. The subject matter of claim 1, wherein said drive means and said steering control extend between the front and rear of said frame and beneath said operator's platform, said platform having a clear space directly thereabove and completely thereacross and to both sides of said platform, and being free of any tractor parts directly thereabove and to said both sides, for direct mounting and demounting by the operator with respect to said platform.

5. The subject matter of claim 1, wherein said drive means is a hydraulic system including a pump and a motor drivingly connected to each of said front ground wheels, and hydraulic connections between said motors in a parallel connection for presenting equal hydraulic pressure to said motors for differential drive action of said motors when said tractor is being steered about a turning center.

6. A self-propelled tractor for supporting and mobilizing lawn mowers, comprising a frame with ground wheels, an operator's station on said frame, a steering mechanism on said frame and connected to at least one of said ground wheels, a prime mover on said frame, vertically movable mower mounting means on said frame, tractor drive means mounted on said frame and being the hydraulic type and being powered by said prime mover and being operatively connected to some of said wheels for mobilizing said tractor and including a hydraulic pump and valve and motor all hydraulically connected together for fluid-flow therebetween, said frame being hollow for presenting a hydraulic container for containing the hydraulic medium of said drive means, said frame extending in a tubular portion in the fore-and-aft direction of said tractor, some portions of said drive means being forwardly located on said tractor and other portions of said drive means being rearwardly located on said tractor, hydraulic connection between said frame tubular portion and said drive means portions, a hydraulic reservoir mounted on said frame and being in fluid-flow communication with said tubular portion of said frame, said prime mover beng located rearwardly of said operator's station and said hydraulic reservoir being located forwardly of said operator's station.

7. The subject matter of claim 6, wherein said tubular frame extends beneath said operator's station.

8. The subject matter of claim 6, including hydraulic lift means connected to said mower mounting means and to said hydraulic pump for raising and lowering said mower mounting means.

9. A tractor for supporting and mobilizing lawn mowers, comprising a frame, three ground wheels mounted on said frame for supporting the latter, an operator's seat on said frame, a gasoline engine and a gas tank on said frame, hydraulic drive means operatively connected between said gasoline engine and said front ground wheels for mobilizing said tractor, mower mounting means on said frame for mounting each of said mowers aligned in front of each of said wheels, a hydraulic reservoir on said frame and being in fluid-flow communication with said hydraulic drive means, said operator's seat being centrally located on said frame, said gasoline engine and said gas tank being located on said frame rearwardly of said operator's seat with respect to the fore-and-aft axis of said tractor, said reservoir being located on said frame forwardly of said operator's seat with respect to said axis, two of said wheels being located forwardly of said operator's seat and with the remaining one of said wheels being located rearwardly of said operator's seat adjacent said gasoline engine, said rear wheel being steerably mounted on said frame, steering mechanism connected with said rear wheel and extending forwardly of said operator's seat, said frame being elongated and extending along said fore-and-aft axis in a portion spaced above the ground and extending rearwardly of said operator's seat, and one of said mower mounting means being located in the space below said frame portion for mounting a lawn mower in said space.

References Cited

UNITED STATES PATENTS

| | | | |
|---|---|---|---|
| 689,001 | 12/1901 | Hill | 180—54.4 |
| 1,283,083 | 10/1918 | Coldwell | 180—1.5 |
| 1,556,965 | 10/1925 | Seeley | 56—7 |
| 2,066,666 | 1/1937 | Becker | 180—1.5X |
| 3,098,574 | 7/1963 | De Marco | 180—66 |
| 3,207,244 | 9/1965 | Becker et al. | 180—66X |
| 3,401,764 | 9/1968 | Schafer | 180—66 |
| 3,410,063 | 11/1968 | Speiser | 56—7 |
| 3,429,110 | 2/1969 | Strasel | 56—7 |

FOREIGN PATENTS

| | | | |
|---|---|---|---|
| 658,706 | 3/1963 | Canada | 56—7 |
| 916,749 | 1/1963 | Great Britain | 180—27 |

A. HARRY LEVY, Primary Examiner

U.S. Cl. X.R.

180—27, 66; 280—106